United States Patent [19]
Little et al.

[11] 3,934,539
[45] Jan. 27, 1976

[54] CHEMILUMINESCENT FOLDABLE SIGNAL DEVICE

[75] Inventors: Steven M. Little, China Lake; Robert L. Gerber, Ridgecrest; Carl A. Heller, China Lake, all of Calif.; Vincent J. Esposito, Washington, D.C.

[73] Assignee: The United States of America as represented by the Secretary of the Navy, Washington, D.C.

[22] Filed: Mar. 26, 1974

[21] Appl. No.: 454,877

[52] U.S. Cl. ........ 116/63 P; 116/114 AM; 240/2.25; 248/46
[51] Int. Cl.² .................... E01F 9/00; F21L 17/00
[58] Field of Search............ 116/63 R, 114 R, 63 P, 116/114 AM, 28 R; 40/125 H, 125 N, 134; 240/2.25; 248/44, 46, 160, 102; 102/87

[56] References Cited
UNITED STATES PATENTS

| | | | |
|---|---|---|---|
| 1,863,756 | 6/1932 | Lufkin | 116/63 P |
| 1,875,424 | 9/1932 | Darling, Jr. et al. | 40/125 H |
| 2,756,526 | 7/1956 | Stein et al. | 40/125 H |
| 2,798,451 | 7/1957 | Hund | 116/63 P |
| 2,887,983 | 5/1959 | Budd | 116/63 P |
| 3,105,457 | 10/1963 | Krueger | 116/63 P |
| 3,292,569 | 12/1966 | Trigilio | 116/63 P |
| 3,360,426 | 12/1967 | Cline | 240/2.25 |
| 3,455,156 | 7/1969 | Kelly | 116/63 P X |
| 3,593,681 | 7/1971 | Sernovitz | 116/63 P |
| 3,764,796 | 10/1973 | Gilliam et al. | 240/2.25 |
| 3,774,022 | 11/1973 | Dubrow et al. | 116/114 AM |
| 3,819,925 | 6/1974 | Richter et al. | 240/2.25 |

*Primary Examiner*—Richard C. Queisser
*Assistant Examiner*—Daniel M. Yasich
*Attorney, Agent, or Firm*—R. S. Sciascia; Roy Miller; Gerald F. Baker

[57] ABSTRACT

A signal device combining a fluorescent or phosphorescent light tube and a novel base to be thrown or dropped from a vehicle as a warning marker. The light tube may be of the chemically actuated type and the base preferably has four pivotally attached resilient legs serving to ensure that the device will assume an angular position of about 45° when dropped.

2 Claims, 4 Drawing Figures

CHEMILUMINESCENT FOLDABLE SIGNAL DEVICE

CROSS REFERENCE TO RELATED APPLICATIONS

Reference is made to Assignees' prior U.S. Pat. No. 3,764,796 and co-pending application Ser. No. 340,434 filed 12 Mar. 1973, now U.S. Pat. No. 3,819,925 each disclosing chemical lighting devices usable with the Signal Device of the present invention. Reference is also made to Assignees' co-pending applications Ser. Nos. 454,876 and 454,878 filed of even date which disclose similar signal devices.

BACKGROUND OF THE INVENTION

Many kinds of emergency flares, flags, reflectors and the like have been devised and used, for example, to warn approaching motorists that a disabled vehicle is present along a highway. All of the known devices, however, take considerable time to deploy, many are fire hazards, and most are susceptible to the destruction of their effectiveness when struck or run over by passing vehicles.

According to the present invention a device is provided which may be dropped or thrown from a vehicle or otherwise placed on the roadway without the necessity for taking time to "set up" the device. When used with a chemically actuated light tube, for instance, the signal device may be easily seen at great distances, is fire proof, and is not easily rendered ineffective by being struck or run over by passing vehicles.

DESCRIPTION AND OPERATION

Figure 1:
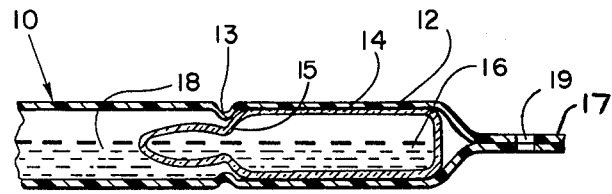
FIG. 1 is a longitudinal cross sectional view of a typical bi-reactant chemical illuminating device usable in carrying out the present invention.

Shown in FIG. 1 generally designated by numeral 10 is a chemical lighting device having an outer cylindrical tube 12 of translucent plastic material and containing a frangible ampoule 14 positioned inside the cylinder. The ampoule 14 is maintained in position by an indentation 13 in tube 12.

Tube 12 is made of a durable non-breakable material such as clear radiation-crosslinked polyolefinic plastic tubing. The ends 17 of the tube are flattened and sealed by application of heat and the flattened ends may be pierced and fitted with a grommet at 19. The ampoule 14 contains an activator material and is preferably made of glass which may be easily broken to effect mixing with the chemiluminescent material 18 which substantially fills the remainder of the tube 12.

A chemical lighting device suitable for use in the present invention is disclosed in assignees co-pending application, Ser. No. 340,434, by Herbert P. Richter and Ruth E. Tedrick now U.S. Pat. No. 3,819,925.

The lighting device may also be of the type disclosed in assignee's prior U.S. Pat. No. 3,764,796 issued 9 Sept. 1973 to Clarence W. Gilliam and Thomas N. Hall. The chemical lighting device of U.S. Pat. No. 3,764,796 comprises two ampoules. In other words, one ampoule contains a chemiluminescent material and the other ampoule contains an activator agent. A chemiluminescent material usable in the light tube might be an oxalate ester such as bis (2, 4, 5-trichloro-6-carbopentoxyphenyl) oxalate, and a fluorescer such as 9, 10 bis (phenylethynyl) anthracene as stated in the patent. Since these lighting devices are the invention of others, applicants make no claim to invention of these devices per se.

Figure 2:
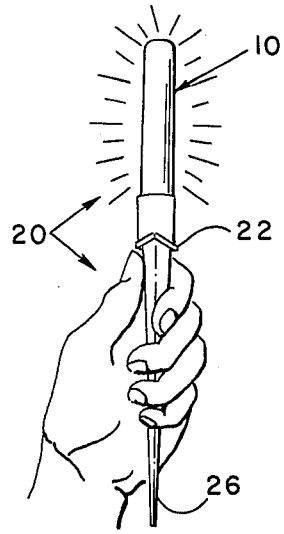
FIG. 2 is a perspective view of a preferred embodiment of the invention with legs folded.
Figure 3:
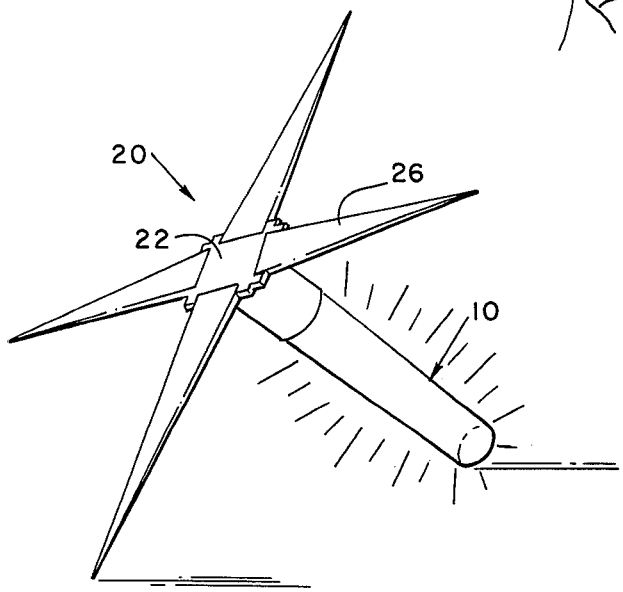
FIG. 3 is a perspective view of the device of FIG. 2 deployed.

According to the present invention, a light tube 10 is fastened to a base 22 as shown generally at 20 in FIGS. 2 and 3. In FIG. 2, the device is shown in a folded or storage position ready for deployment. In the condition shown in FIG. 2, the device takes up no more room than a conventional flare now in general use.

In this position the legs may be taped or banded to hold them together for storage. Alternatively, the legs may be folded in the other direction alongside the tube and the assembly packaged in a tube similar to those used for packaging fine cigars.

As shown in FIG. 3, the base 22 carries four legs 26 each hinged and biased to assume a position orthogonal to light tube 10. When in deployed position, therefore, the legs assure that the light tube will be held at an angle to the roadway of about 45° for better visibility.

Figure 4:
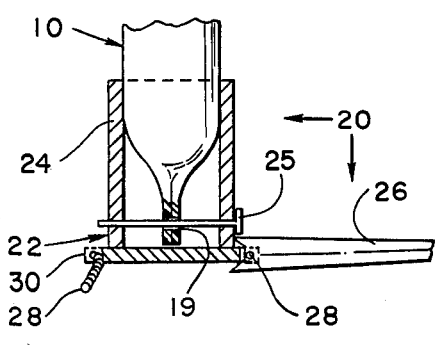
FIG. 4 is an enlarged side elevational detail view of a portion of the holder of FIG. 2 partly in section.

The light tube 10 may be pinned to the base member 22 through a tubular extension 24 as shown in FIG. 4. Legs 26 may be fastened to base 22 in any suitable manner for mass production but are here shown fastened by a continuous spring 28 threaded through the base of each of the legs and through tabs 30 on base member 22. Any movement of the legs from the position shown in FIGS. 3 and 4 will result in stretching coiled spring 28. When the legs are folded in either direction, therefore, they are biased toward the outstretched position shown in FIG. 3.

The ampoule or ampoules are broken by bending tube 12 at 13 to snap the neck 15 of the ampoule and allow the chemicals to mix. The device is then thrown, dropped or otherwise placed on or near the roadway or may be placed on the roof of cab or van. The device will then give off light for the duration of the life of the chemicals.

The light tube is not extinguished by wind, rain or by being run over by passing cars. When placed upon a flat surface the device will be maintained in an upright position and, or course, the device could land in that position even when dropped or thrown from a vehicle.

What is claimed is:

1. For use as a signal device to be deployed upon a supporting surface, the combination comprising:
    an elongated plastic tubular chemiluminescent light member;
    a detachably connected support means effective to maintain said light member at an angle of 45° or more to the surface upon which it is deployed;
    said support means comprising;
    a tubular cup shaped portion receiving one end of said light member;
    a generally square base portion orthogonal to said cup portion; and
    said square base portion having four elongated legs pivotally fastened to the four sides thereof and biased to a position orthogonal to said cup portion so that said legs may be folded together for convenience in storage and yet when said legs are deployed they present four points extending orthogonal to said cup portion.

2. The device of claim 1 wherein said light member comprises manually actuable chemiluminescent means.

* * * * *